United States Patent
Paschall et al.

(10) Patent No.: US 12,037,247 B2
(45) Date of Patent: Jul. 16, 2024

(54) PRISTINE AND ULTRA-REDUCED GRAPHENE OXIDE AS A CARRIER FOR ENZYMES AND CATALYSTS

(71) Applicant: Akron Polymer Solutions, Inc., Rancho Santa Margarita, CA (US)

(72) Inventors: Douglas Paschall, Rancho Santa Margarita, CA (US); Adel Halasa, Akron, OH (US); Michael Brendan Rodgers, Leander, TX (US)

(73) Assignee: Akron Polymer Solutions, Inc.

( * ) Notice: Subject to any disclaimer, the term of this patent is extended or adjusted under 35 U.S.C. 154(b) by 0 days.

(21) Appl. No.: 18/296,476

(22) Filed: Apr. 6, 2023

(65) Prior Publication Data

US 2023/0322561 A1    Oct. 12, 2023

Related U.S. Application Data

(60) Provisional application No. 63/362,610, filed on Apr. 7, 2022.

(51) Int. Cl.
```
C01B 32/194    (2017.01)
A01N 25/34     (2006.01)
A01N 35/02     (2006.01)
A01N 57/20     (2006.01)
A01P 1/00      (2006.01)
B01J 21/18     (2006.01)
B01J 31/00     (2006.01)
```

(52) U.S. Cl.
CPC .......... *C01B 32/194* (2017.08); *A01N 25/34* (2013.01); *A01N 35/02* (2013.01); *A01N 57/20* (2013.01); *A01P 1/00* (2021.08); *B01J 21/18* (2013.01); *B01J 31/003* (2013.01); *C01B 2204/04* (2013.01); *C01B 2204/32* (2013.01); *C01P 2004/24* (2013.01)

(58) Field of Classification Search
CPC .................................... C01B 32/194
See application file for complete search history.

(56) References Cited

U.S. PATENT DOCUMENTS

2017/0037252 A1* 2/2017 Bosnyak ............... B01J 37/343
2022/0056599 A1   2/2022 Han et al.

FOREIGN PATENT DOCUMENTS

CN    106582810 A      4/2017
WO    WO2021102523 A1  6/2021

OTHER PUBLICATIONS

Sun et al (Chem. Eur. J. 2014, 20, 5752-5761) (Year: 2017).*
De Luna et al (J Nanobiotechnol (2016) 14:12) (Year: 2016).*
Lai et al, Asian Journal of Pharmaceutical Sciences 16 (2021) 577â588 (Year: 2021).*
Heo, Joo Hyung; PCT Search Report; PCT/US2023/065459; dated Aug. 7, 2023; 3 pages.
Heo, Joo Hyung; PCT Written Opinion; PCT/US2023/065459; dated Aug. 7, 2023; 3 pages.
Wang, H. et al., "Pristine graphene dispersion in solvents and its application as a catalyst support: a combined theoretical and experimental study", J. mater. chem. A, 2015, vol. 3, pp. 6282-6285.
Yam, K. M. et al., "Graphene-based heterogeneous catalysis: role of graphene", Catalysts, 2020, vol. 10, No. 53, pp. 1-17.

* cited by examiner

*Primary Examiner* — Benjamin J Packard
(74) *Attorney, Agent, or Firm* — Emerson Thomson Bennett; Daniel A. Thomson

(57) ABSTRACT

The introduction of graphene as a carrier for enzymes and catalysts is disclosed.

16 Claims, 1 Drawing Sheet

Reduced to Ultra-Reduced Graphene Oxide

Reduced to Ultra-Reduced Graphene Oxide

Intercalated-Flocculated    Intercalated    Exfoliated

PRISTINE AND ULTRA-REDUCED GRAPHENE OXIDE AS A CARRIER FOR ENZYMES AND CATALYSTS

This application claims priority to U.S. Ser. No. 63/362,610, filed Apr. 7, 2023, the contents of which are incorporated herein by reference. The present teaching is directed to the use of graphene as carrier. More specifically, the present technology is directed to the use of pristine and ultra-reduced graphene oxide as a carrier for enzymes and catalysts.

I. BACKGROUND

Graphene is an allotrope of carbon consisting of a single layer of atoms arranged in a two-dimensional honeycomb lattice. The hexagonal lattice structure of isolated, single-layer graphene can be directly seen with transmission electron microscopy (TEM) of sheets of graphene suspended between bars of a metallic grid. Some of these images showed a "rippling" of the flat sheet, with amplitude of about one nanometer. The hexagonal structure is also seen in scanning tunneling microscope (STM) images of graphene supported on silicon dioxide substrates. Ab initio calculations show that a graphene sheet is thermodynamically unstable if its size is less than about 20 nm and becomes the most stable fullerene (as within graphite) only for molecules larger than 24,000 atoms. Each atom in a graphene sheet is connected to its three nearest neighbors by a σ-bond, and contributes one electron to a conduction band that extends over the whole sheet. This is the same type bonding seen in carbon nanotubes and polycyclic aromatic hydrocarbons, and (partially) in fullerenes and glassy carbon. These conduction bands make graphene a semimetal with unusual electronic properties that are best described by theories for massless relativistic particles. Charge carriers in graphene show linear, rather than quadratic, dependence of energy on momentum, and field-effect transistors with graphene can be made that show bipolar conduction. Charge transport is ballistic over long distances; the material exhibits large quantum oscillations and large and nonlinear diamagnetism. Graphene conducts heat and electricity very efficiently along its plane. The material strongly absorbs light of all visible wavelengths, which accounts for the black color of graphite; yet a single graphene sheet is nearly transparent because of its extreme thinness. The material is also about 100 times stronger than would be the strongest steel of the same thickness.

Single layers of carbon atoms are grown epitaxially on top of other materials. This "epitaxial graphene" consists of a single-atom-thick hexagonal lattice of $sp^2$-bonded carbon atoms, as in free-standing graphene. However, there is significant charge transfer between the two materials, and, in some cases, hybridization between the d-orbitals of the substrate atoms and π orbitals of graphene; which significantly alter the electronic structure compared to that of free-standing graphene.

Three of the four outer-shell electrons of each atom in a graphene sheet occupy three $sp^2$ hybrid orbitals—a combination of orbitals s, $p_x$ and $p_y$—that are shared with the three nearest atoms, forming σ-bonds. The length of these bonds is about 0.142 nanometers. The remaining outer-shell electron occupies a $p_z$ orbital that is oriented perpendicularly to the plane. These orbitals hybridize together to form two half-filled bands of free-moving electrons, π and π*, which are responsible for most of graphene's notable electronic properties. Graphene sheets stack to form graphite with an interplanar spacing of 0.335 nm (3.35 Å). Graphene sheets in solid form usually show evidence in diffraction for graphite's layering.

Graphene is a zero-gap semiconductor, because its conduction and valence bands meet at the Dirac points. The Dirac points are six locations in momentum space, on the edge of the Brillouin zone, divided into two non-equivalent sets of three points. The two sets are labeled K and K'. The sets give graphene a valley degeneracy of gv=2. By contrast, for traditional semiconductors the primary point of interest is generally Γ, where momentum is zero. Four electronic properties separate it from other condensed matter systems. However, if the in-plane direction is no longer infinite, but confined, its electronic structure would change. They are referred to as graphene nanoribbons. If it is "zig-zag," the bandgap would still be zero. If it is "armchair," the bandgap would be non-zero. Graphene's hexagonal lattice can be regarded as two interleaving triangular lattices. This perspective was successfully used to calculate the band structure for a single graphite layer using a tight-binding approximation. Electrons propagating through graphene's honeycomb lattice effectively lose their mass, producing quasi-particles that are described by a 2D analogue of the Dirac equation rather than the Schrödinger equation for spin-½ particles.

Graphene displays remarkable electron mobility at room temperature, with reported values in excess of 15000 $cm^2 \cdot V^{-1} \cdot s^{-1}$. Hole and electron mobilities are nearly the same. The mobility is independent of temperature between 10 K and 100 K, and shows little change even at room temperature (300 K), which implies that the dominant scattering mechanism is defect scattering. Scattering by graphene's acoustic phonons intrinsically limits room temperature mobility in freestanding graphene to 200000 $cm^2 \cdot V^{-1} \cdot s^{-1}$ at a carrier density of $10^{12}$ $cm^{-2}$. The corresponding resistivity of graphene sheets would be $10^{-6}$ Ω·cm. This is less than the resistivity of silver, the lowest otherwise known at room temperature. However, on $SiO_2$ substrates, scattering of electrons by optical phonons of the substrate is a larger effect than scattering by graphene's own phonons. This limits mobility to 40000 $cm^2 \cdot V^{-1} \cdot s^{-1}$. Charge transport has major concerns due to adsorption of contaminants such as water and oxygen molecules. This leads to non-repetitive and large hysteresis I-V characteristics. Electrical resistance in 40-nanometer-wide nanoribbons of epitaxial graphene changes in discrete steps. The ribbons' conductance exceeds predictions by a factor of 10. The ribbons can act more like waveguides or quantum dots, allowing electrons to flow smoothly along the ribbon edges. In copper, resistance increases in proportion to length as electrons encounter impurities. Transport is dominated by two modes. One is ballistic and temperature independent, while the other is thermally activated. Ballistic electrons resemble those in cylindrical carbon nanotubes. At room temperature, resistance increases abruptly at a particular length—the ballistic mode at 16 micrometers and the other at 160 nanometers (1% of the former length).

Graphene's permittivity varies with frequency. Over a range from microwave to millimeter wave frequencies it is roughly 3.3. This permittivity, combined with the ability to form both conductors and insulators, means that theoretically, compact capacitors made of graphene could store large amounts of electrical energy. Graphene's unique optical properties produce an unexpectedly high opacity for an atomic monolayer in vacuum, absorbing πα2.3% of light, from visible to infrared. Here, α is the fine-structure constant.

When single-layer graphene is supported on an amorphous material, the thermal conductivity is reduced to about 500-600 W·m$^{-1}$·K$^{-1}$ at room temperature as a result of scattering of graphene lattice waves by the substrate, and can be even lower for few layer graphene encased in amorphous oxide. Likewise, polymeric residue can contribute to a similar decrease in the thermal conductivity of suspended graphene to approximately 500 to 600 W·m$^{-1}$·K$^{-1}$ for bilayer graphene. It has been suggested that the isotopic composition, the ratio of $^{12}$C to $^{13}$C, has a significant impact on the thermal conductivity. For example, isotopically pure $^{12}$C graphene has higher thermal conductivity than either a 50:50 isotope ratio or the naturally occurring 99:1 ratio. It can be shown by using the Wiedemann-Franz law, that the thermal conduction is phonon-dominated. Potential for this high conductivity can be seen by considering graphite, a 3D version of graphene that has basal plane thermal conductivity of over a 1000 W·m$^{-1}$·K$^{-1}$ (comparable to diamond). In graphite, the c-axis (out of plane) thermal conductivity is over a factor of ~100 smaller due to the weak binding forces between basal planes as well as the larger lattice spacing. Despite its 2-D nature, graphene has three acoustic phonon modes. The two in-plane modes (LA, TA) have a linear dispersion relation, whereas the out of plane mode (ZA) has a quadratic dispersion relation. Due to this, the $T^2$ dependent thermal conductivity contribution of the linear modes is dominated at low temperatures by the $T^{1.5}$ contribution of the out of plane mode.

The (two-dimensional) density of graphene is 0.763 mg per square meter. Graphene has an intrinsic tensile strength of 130 GPa (19,000,000 psi) (with representative engineering tensile strength ~50-60 GPa for stretching large-area freestanding graphene) and a Young's modulus (stiffness) close to 1 TPa (150,000,000 psi). The spring constant of suspended graphene sheets has been measured using an atomic force microscope (AFM). Graphene sheets were suspended over $SiO_2$ cavities where an AFM tip was used to apply a stress to the sheet to test its mechanical properties. Its spring constant was in the range 1-5 N/m and the stiffness was 0.5 TPa, which differs from that of bulk graphite.

Graphene has a theoretical specific surface area (SSA) of 2630 m$^2$/g. This is much larger than for carbon black (typically smaller than 900 m$^2$/g) or for carbon nanotubes (CNTs), from ≈100 to 1000 m$^2$/g and is similar to activated carbon. Graphene is the only form of carbon (or solid material) in which every atom is available for chemical reaction from two sides (due to the 2D structure). Atoms at the edges of a graphene sheet have special chemical reactivity. Graphene has the highest ratio of edge atoms of any allotrope. Defects within a sheet increase its chemical reactivity. The onset temperature of reaction between the basal plane of single-layer graphene and oxygen gas is below 260° C. (530 K). Graphene burns at very low temperature (e.g., 350° C. (620 K)). Examples of types of graphene are monolayer sheets, bilayer graphene, graphene superlattices, graphene nanoribbons, graphene quantum dots, graphene oxide, reduced graphene oxide, pristine graphene, graphene ligand/complex, graphene fiber, 3D graphene, pillared graphene, reinforced graphene, molded graphene, graphene aerogel, graphene nanocoil, and crumpled graphene. The present teaching uses graphene forms which exfoliate into monolayer sheets, as in a polymer nanocomposite, and are of an inert condition, i.e., limited to no chemical functionality such as carboxylic acid, ketone, aldehyde, or hydroxyl groups on the graphene plate surface or plate edges.

II. SUMMARY

Graphene has been reported as a carrier for both enzymes and catalysts. Inventions have pertained to (i) immobilizing the enzyme or other active ingredient, though this may hinder the reactivity of the material, i.e., via creating steric hindrance around the enzyme's active site, and (ii) modification of pristine graphene, such as addition of an organometallic entities, thus allowing targeted catalysis. The present teaching considers no partial, to very minor, immobilization with the majority of the active material (enzymes or catalysts) being highly dispersed in solution or suspension systems.

Inert or pristine graphene can thus have four or more roles, as follows:
Catalyst carriers;
As controlled release agents for pharmaceuticals;
Enzymes inert carriers; and
Molecular Barriers.

Still other benefits and advantages of the present subject matter will become apparent to those skilled in the art to which it pertains upon a reading and understanding of the following detailed specification.

III. BRIEF DESCRIPTION OF THE DRAWINGS

The present teachings are described hereinafter with reference to the accompanying drawings.

IV. DETAILED DESCRIPTION

Applications for graphene and specifically inert and partially inert graphene, also referred to as pristine graphene, can include environmentally acceptable "green" building materials, high strength coatings, bio-pharma uses as an inert carrier, bio-plastics, health care, safe food (distribution remains the greatest challenge), impermeable bio-plastic food wrap, and clean water (filtration).

Example 1

Three grades of pristine graphene are described as carriers for both enzymes in bio-systems and as catalysts (Table 1). Though not limited to this, there are three commercial grades of graphene under the commercial name of Prophene™ considered in this Example.

Grade PS50 with particle, sheet, or plate sizes of about 50 nm to about 5 microns;

Grade PS100 with particle, sheet, or plate sizes of about 100 nm to about 5 microns, with increasing conductivity; and Grade PS150 with particle, sheet, or plate sizes of about 150 nm to about 10 microns.

Properties in rubber nanocomposites include electrical conductivity and thermal conductivity, improved nanocomposite compound hysteresis, tear strength, abrasion resistance, and reduction in permeability or gas flow.

Figure 1:
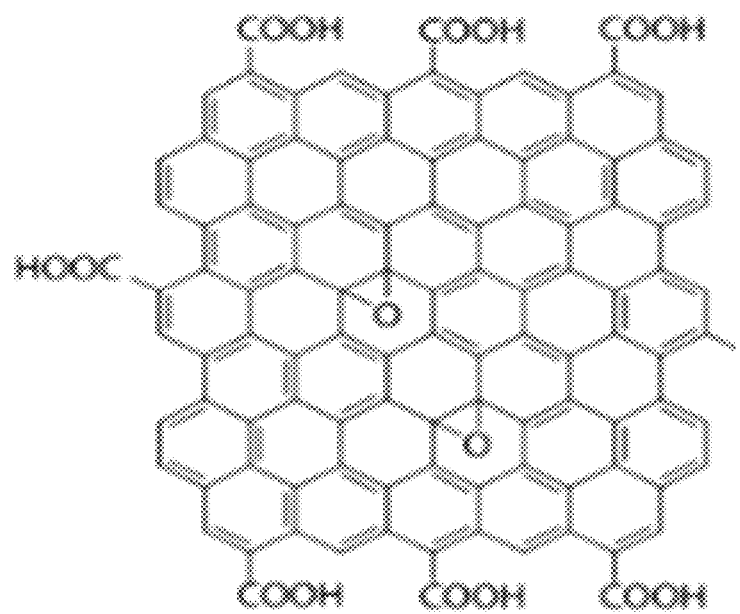
FIG. 1 depicts ultra-reduced graphene oxide with only minor levels of edge —COOH groups.

The specific types or grades of graphene described herein render their application suitable in bio- and catalysis systems for the following, non-limiting reasons:

1. No, to very limited, functionality on the graphene plate surface: functionality defined as the presence of reactive groups such as carboxylic acids, aldehyde groups, ketones, quinones, and alcohols and other oxygenated entities, and surface defects such as electronic vacancies in the graphene 6-membered aromatic rings;

2. Potential plate edge minor functionality lending the plates suited to partial immobilization of entities such as catalysts and enzymes (FIG. 1);
3. Very large aspect ratio of graphene, with plates up to ten to fifteen microns; and
4. Ease of exfoliation in many suspension and solution systems.

Table 1 shows the properties of proposed graphenes as carriers.

TABLE 1

Properties of Proposed Graphenes for Carriers

|  |  | Grade | | |
| --- | --- | --- | --- | --- |
|  |  | PS 50 | PS 100 | PS 150 |
| Form |  | Light powder | Light powder | Light powder |
| Color |  | Dark grey/Black | Dark grey/Black | Dark grey/Black |
| Odor |  | None | None | None |
| Resistivity (Powder) | ohm cm | <50 | <100 | <150 |
| Particle size | nm | 50 nm-5 μm | 100 nm-5 μm | 150 nm-10 μm |
| Particle thickness | max | 1.7 nm | 2.5 nm | 2.8 nm |
| Layer count | < | 10 | <15 | <16 |
| Density | g/cm$^3$ | 2.200 | 2.200 | 2.200 |
| Specific surface area | m$^2$/g | 250.0 | 180.0 | 100.0 |

Example 2

Figure 2:
FIG. 2 depicts the potential states of Graphene: Exfoliated, Intercalated, Flocculated In a Nanocomposite System.

In rubber nanocomposite systems the graphene plates are believed to be exfoliated, or at a minimum an intercalated state is obtained, i.e., where the graphene is very well dispersed but there are still stacks of pristine graphene plates 2 to 6 layers deep (FIG. 2). The high level of dispersion results in increased shear during composite blending, which is due to the very large aspect ratio of the graphene plates. The quality, uniformity, and homogeneity of the dispersion is thus improved.

The high level of shear thus results in a highly dispersed mixer and high level of mixture homogeneity. This allows for better mechanical properties as observed in rubber nanocomposites.

Such systems also show increased electrical conductivity due to an apparent low percolation point not observed with conventional systems, such as those containing carbon black. Such conductivity might lend itself to uses in built-in antennae for articles such as RFID sensors in tires or other applications.

Example 3

Graphene can function as (i) an enzyme carrier, and ii) dispersion aid in a suspension or solution. Partial immobilization and full immobilization of multi-enzymes on support materials improve biocatalysts efficiency. It can also facilitate multi-enzyme immobilization. There are several reasons to use immobilized enzymes. In addition to the convenient handling of enzyme preparations, the two main targeted benefits are: (1) easy separation of enzyme from the product; and (2) reuse of the enzyme. Easy separation of the enzyme from the product simplifies enzyme applications and permits reliable and efficient reaction technology. Enzyme reuse provides a number of cost advantages, which are often an essential prerequisite for establishing an economically viable enzyme-catalyzed process. Enzyme immobilization can be divided into several categories such as the following:
   a. binding to a support;
   b. cross-linking;
   c. encapsulation (entrapment);
   d. homogeneous system dispersion; and
   e. lubricating by improving rheology or system flow properties.

Homogeneous enzyme system dispersion can be chosen to ensure improved efficiency. Furthermore, reduced, to no, graphene functionality ensures no side reactions or interference reactions. However, in instances where there is functionality on the graphene plate surface or edges, i.e., graphene oxides, the activity and reusability of the enzymes could be improved by controlling the extent of graphene oxide reduction. Graphene-based materials have unique optical, mechanical, and electrical properties which make them attractive for many applications. Oxidation of graphite powder to graphene oxide (GO) followed by chemical reduction to reduced graphene oxide (r-GO) is a well-established approach to generating graphene based materials. Numerous methods of chemical reduction to r-GO have been published where hydrazine hydrate, dimethylhydrazine, hydroquinone, NaBH$_4$, HI and Fe and Zn powder have been used to reduce GO. Since the GO from different sources vary widely and contains a wide range of oxygen containing groups such as hydroxyl, carboxyl and epoxy, r-GO represents a family of material with different physical/chemical properties. Reduced graphene oxide (rGO) contains residual oxygen and other heteroatoms, as well as structural defects. Despite rGO's less-than-perfect resemblance to pristine graphene, it is still an appealing material that can definitely be sufficient in quality for various applications, but for more attractive pricing and manufacturing processes.

The large plate size of graphene in this instance will further maximize dispersion and homogeneity thus further ensuring enzyme efficiency and utility.

Example 4

Regarding Biocides: water supplies are stressed due to increasing demand, greater cleanliness in drinking water supplies, anti-pollution, and environmental sustainability requirements. There is also growing demand for water treatment biocides, such as glutaraldehyde and t-hydroxymethyl-phosphonium sulfate (THPS) in oil and gas applications. With pristine graphene, biocide effectiveness in many systems could be enhanced due to effective dispersion and therefore lower quantitative demands. It is understood that graphene in a suspension with biocides will increase the degree of dispersion, homogeneity of the suspension, and thus efficiency of utilization.

Example 5

Mechanical and thermal stability allows graphene, and specifically pristine graphene, to support heterogeneous catalysts systems ranging from single to bi-functional, hybrid, oxide and nano systems. Application also widens the heterogeneous catalyst application areas, including:
   chemical conversion;
   photocatalysts;
   sensors; and
   fuel cells and energy storage.

Areas of applicability include water purification, hydrogen generation and production, and graphene-based catalysts for electrochemical carbon dioxide reduction.

Pristine graphene will facilitate improved catalyst efficiency via dispersion and creating of homogeneous suspensions or solutions. It is understood that graphene in a suspension or solution with a catalyst, either immobilized, added via graphene surface doping as describe below, or as an agent increasing suspension shear, will increase the degree of dispersion, homogeneity of the suspension, and thus efficiency of utilization.

In addition, a second technique to use pristine graphene in chemical systems is via metal doping of graphene which can increase the number of active sites for electrochemical $CO_2$ reduction; this improvement can be ascribed to an increase in charge and spin density caused by an increase in adsorption sites of $CO_2$ molecules. Prophene™ renders itself suitable for such utilization.

Non-limiting aspects have been described, hereinabove. It will be apparent to those skilled in the art that the above methods and apparatuses may incorporate changes and modifications without departing from the general scope of the present subject matter. It is intended to include all such modifications and alterations in so far as they come within the scope of the appended claims or the equivalents thereof.

We claim:

1. A method of providing a carrier for enzymes, biocides, and catalysts, the method comprising the steps of:
   providing pristine graphene, wherein the pristine graphene is graphene plates, wherein the graphene plates have a thickness of between about 1.7 nm and about 2.8 nm, wherein the graphene plates have no reactive groups; and
   dispersing the pristine graphene in a dispersion.

2. A method of providing a carrier for enzymes, biocides, and catalysts, the method comprising the steps of:
   providing pristine graphene, wherein the pristine graphene has a particle size of about 50 nm to about 10 microns.

3. The method of claim 1, wherein the graphene plates are intercalated, wherein the dispersion has stacks of graphene plates from about two to about six layers.

4. The method of claim 1, wherein enzymes are immobilized.

5. The method of claim 1, wherein catalysts are immobilized.

6. The method of claim 5, wherein heterogeneous catalyst systems are supported.

7. The method of claim 6, wherein the heterogeneous catalyst systems are chosen from the group consisting of bi-functional, hybrid, oxide, and nano.

8. The method of claim 1, wherein catalytic immobilization results in less stearic hindrance around reaction sites.

9. The method of claim 1, wherein a biocide is in suspension with the pristine graphene.

10. The method of claim 9, wherein the pristine graphene is graphene plates, wherein the graphene plates have a thickness of between about 2.5 nm and about 2.8 nm.

11. The method of claim 9, wherein the pristine graphene has a particle size of about 50 nm to about 10 microns.

12. The method of claim 10, wherein the graphene plates are intercalated, wherein the dispersion has stacks of graphene plates from about two to about six layers.

13. The method of claim 9, wherein degree of dispersion is increased and the suspension is homogenized.

14. The method of claim 1, wherein the graphene plates have a thickness of between about 2.5 nm and about 2.8 nm.

15. The method of claim 1, wherein the graphene plates have a thickness of about 2.5 nm.

16. The method of claim 1, wherein the graphene plates have a thickness of about 2.8 nm.

* * * * *